United States Patent
Wong (10) Patent No.: US 11,132,362 B2
(45) Date of Patent: Sep. 28, 2021

(54) METHOD AND SYSTEM OF OPTIMIZING DATABASE SYSTEM, ELECTRONIC DEVICE AND STORAGE MEDIUM

(71) Applicant: PING AN TECHNOLOGY (SHENZHEN) CO., LTD., Shenzhen (CN)

(72) Inventor: Yeung Wong, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 418 days.

(21) Appl. No.: 16/084,228

(22) PCT Filed: Jun. 30, 2017

(86) PCT No.: PCT/CN2017/091375
§ 371 (c)(1),
(2) Date: Sep. 12, 2018

(87) PCT Pub. No.: WO2018/149085
PCT Pub. Date: Aug. 23, 2018

(65) Prior Publication Data
US 2019/0065548 A1    Feb. 28, 2019

(30) Foreign Application Priority Data

Feb. 20, 2017   (CN) .......................... 201710088152.5

(51) Int. Cl.
*G06F 16/20* (2019.01)
*G06F 16/2453* (2019.01)
(Continued)

(52) U.S. Cl.
CPC ...... *G06F 16/2453* (2019.01); *G06F 11/3409* (2013.01); *G06F 16/2433* (2019.01);
(Continued)

(58) Field of Classification Search
None
See application file for complete search history.

(56) References Cited

U.S. PATENT DOCUMENTS

2005/0125393 A1*  6/2005  Yagoub ................ G06F 16/217
2013/0159321 A1   6/2013  Bossman et al.
(Continued)

FOREIGN PATENT DOCUMENTS

| CN | 103390066 A | 11/2013 |
|----|-------------|---------|
| CN | 105243068 A | 1/2016 |
| CN | 105302858 A | 2/2016 |

*Primary Examiner* — Kristopher Andersen (57) ABSTRACT

The disclosure relates to a method of optimizing a database system, including: snapshotting performance data of each Structured Query Language sentence of the database system every preset first time, and arranging and storing snapshots according to a time sequence, wherein the performance data include the number of times of executions and a buffer gets data volume; correspondingly carrying out variance calculation on the performance data of the current snapshot and the performance data of the former snapshot respectively to calculate a total buffer gets data volume and a single-execution buffer gets data average volume which correspond to each SQL sentence within the preset first time; obtaining a value sum of the total buffer gets data volume and the single-execution buffer gets data average volume of each SQL sentence, and selecting an SQL sentence to be optimized on the basis of the value sum.

9 Claims, 7 Drawing Sheets

---

S1: Snapshoting performance data of each SQL sentence of the database system every preset first time, and arranging and storing snapshots according to a time sequence, wherein the performance data include the number of times of executions and a buffer gets data volume S2: Correspondingly carrying out variance calculation on the performance data of the current snapshot and the performance data of the former snapshot respectively to calculate a total buffer gets data volume and a single-execution buffer gets data average volume which correspond to each SQL sentence within the preset first time S3: Obtaining a value sum of the total buffer gets data volume and the single-execution buffer gets data average volume of each SQL sentence, and selecting an SQL sentence to be optimized on the basis of the value sum (51) Int. Cl.
  *G06F 16/242*   (2019.01)
  *G06F 16/2455*  (2019.01)
  *G06F 11/34*    (2006.01)
  *G06F 11/30*    (2006.01)

(52) U.S. Cl.
  CPC .... *G06F 16/24564* (2019.01); *G06F 2201/80* (2013.01); *G06F 2201/84* (2013.01)

(56) References Cited

U.S. PATENT DOCUMENTS

2015/0081669 A1   3/2015  Belknap
2018/0107711 A1*  4/2018  Tariq .................... G06F 16/217

* cited by examiner

Fig. 7

METHOD AND SYSTEM OF OPTIMIZING DATABASE SYSTEM, ELECTRONIC DEVICE AND STORAGE MEDIUM

CROSS REFERENCE TO RELATED APPLICATIONS

This application is a national phase entry of the international application PCT/CN2017/091375, filed on Jun. 30, 2017 and claims priority to China Patent Application No. CN2017100881525, filed on Feb. 20, 2017 and entitled "Method and Device of Optimizing Database System", which is hereby incorporated by reference in its entirety.

TECHNICAL FIELD

This disclosure relates generally to the technical field of databases, and more particularly relates to a method and system of optimizing a database system, an electronic device and a computer readable storage medium.

BACKGROUND

Structured Query Language (SQL) sentences of a database have various different writing styles. The SQL sentences with different writing styles are related to the performance of an application system. In the initial stage of development of the application system, the database stores a small amount of data, and the SQL sentences with different writing styles have little impact on the application system. In actual application, the data volume in the database would be increased continuously, which has great impact on the response speed of the application system, so that it needs to optimize the SQL sentences to optimize the application system.

At the present, a Database Administrator (DBA) generally manually selects SQL sentences for optimization in face of a large number of SQL sentences. If the selected SQL sentences are not often used, even though the sentences are optimized, the response speed of the application system may not be improved; and therefore, the manual selection mode may not accurately position SQL sentences in need of optimization, and is low in optimization efficiency.

SUMMARY

The disclosure aims to provide a method and system of optimizing a database system, an electronic device and a computer readable storage medium, and aims at accurately positioning a Structured Query Language (SQL) sentence in need of optimization and improving the optimization efficiency.

To achieve the objective, a method of optimizing a database system is provided, including:

S1, snapshotting performance data of each Structured Query Language (SQL) sentence of the database system every preset first time, and arranging and storing snapshots according to a time sequence, wherein the performance data include the number of times of executions and a buffer gets data volume;

S2, correspondingly carrying out variance calculation on the performance data of the current snapshot and the performance data of the former snapshot respectively to calculate a total buffer gets data volume and a single-execution buffer gets data average volume which correspond to each SQL sentence within the preset first time;

S3, obtaining a value sum of the total buffer gets data volume and the single-execution buffer gets data average volume of each SQL sentence, and selecting an SQL sentence to be optimized on the basis of the value sum.

To achieve the objective, a system of optimizing a database system is further provided, including:

a snapshotting module, which is used for snapshotting performance data of each Structured Query Language (SQL) sentence of the database system every preset first time, and arranging and storing snapshots according to a time sequence, wherein the performance data include the number of times of executions and a buffer gets data volume;

a calculation module, which is used for correspondingly carrying out variance calculation on the performance data of the current snapshot and the performance data of the former snapshot respectively to calculate a total buffer gets data volume and a single-execution buffer gets data average volume which correspond to each SQL sentence within the preset first time;

a selection module, which is used for obtaining a value sum of the total buffer gets data volume and the single-execution buffer gets data average volume of each SQL sentence, and selecting an SQL sentence to be optimized on the basis of the value sum.

To achieve the objective, an electronic device is further provided, including a memory and a processor connected with the memory. The memory stores a system of optimizing a database system, which may be operated on the processor; and the system of optimizing the database system is executed by the processor to implement the following steps:

S1, snapshotting performance data of each Structured Query Language (SQL) sentence of the database system every preset first time, and arranging and storing snapshots according to a time sequence, wherein the performance data include the number of times of executions and a buffer gets data volume;

S2, correspondingly carrying out variance calculation on the performance data of the current snapshot and the performance data of the former snapshot respectively to calculate a total buffer gets data volume and a single-execution buffer gets data average volume which correspond to each SQL sentence within the preset first time;

S3, obtaining a value sum of the total buffer gets data volume and the single-execution buffer gets data average volume of each SQL sentence, and selecting an SQL sentence to be optimized on the basis of the value sum.

To achieve the objective, a computer readable storage medium is further provided, which stores a system of optimizing a database system. The system of optimizing the database system is executed by a processor to implement the following steps:

S1, snapshotting performance data of each Structured Query Language (SQL) sentence of the database system every preset first time, and arranging and storing snapshots according to a time sequence, wherein the performance data include the number of times of executions and a buffer gets data volume;

S2, correspondingly carrying out variance calculation on the performance data of the current snapshot and the performance data of the former snapshot respectively to calculate a total buffer gets data volume and a single-execution buffer gets data average volume which correspond to each SQL sentence within the preset first time;

S3, obtaining a value sum of the total buffer gets data volume and the single-execution buffer gets data average volume of each SQL sentence, and selecting an SQL sentence to be optimized on the basis of the value sum.

The disclosure has the beneficial effects that by snapshotting the performance data of the SQL sentences every preset time, and carrying out the variance calculation on the performance data snapshot at this time and the performance data snapshot at the last time to calculate the total buffer gets data volume and the single-execution buffer gets data average volume which correspond to each SQL sentence within the preset time, SQL sentences with high use frequency and performance may be obtained according to the total buffer gets data volume and the single-execution buffer gets data average volume which correspond to each SQL sentence, and are optimized, thus improving the response speed of an application system. As the SQL sentence to be optimized is selected on the basis of the value sum of the total buffer gets data volume and the single-execution buffer gets data average volume, the disclosure can accurately position the SQL sentence to be optimized, and the optimization efficiency is improved.

DETAILED DESCRIPTION OF EMBODIMENTS

The theory and features of the disclosure will be described below in connection with accompanying drawings, and the embodiments described herein are merely illustrative of the disclosure, but are not intended to limit the disclosure.

Figure 1:
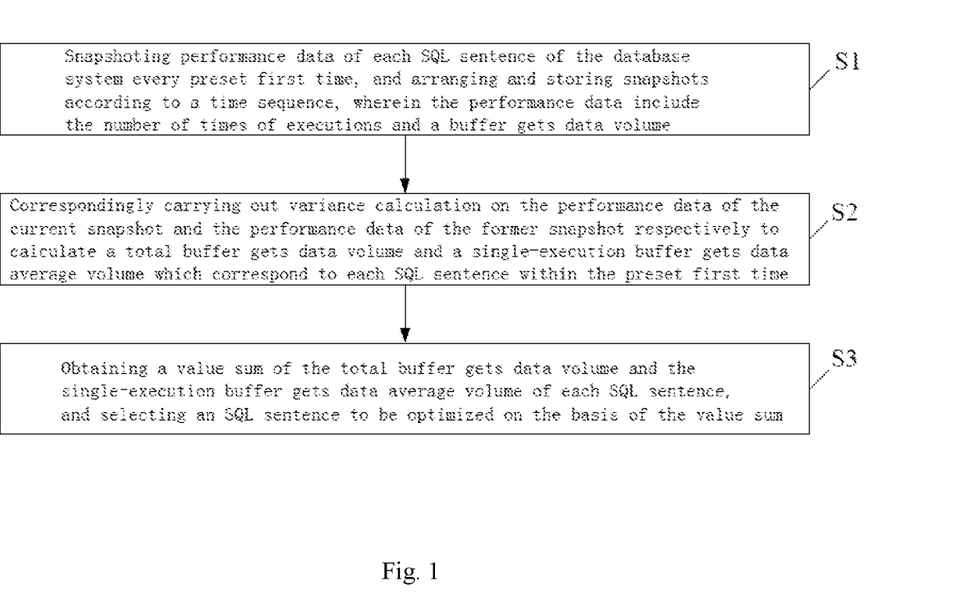
FIG. 1 is a flowchart of a first embodiment of a method of optimizing a database system of the disclosure.

As shown in FIG. 1, FIG. 1 is a flowchart of an embodiment of a method of optimizing a database system of the disclosure. The method of optimizing the database system is applied to an electronic device, including:

Step S1, snapshotting is carried out on performance data of each Structured Query Language (SQL) sentence of the database system every preset first time, and snapshots are arranged and stored according to a time sequence;

In this embodiment, the snapshotting is carried out on the performance data of each SQL sentence of the database system every the preset first time, for example, the snapshotting is carried out on the performance data of each SQL sentence every 1 hour so as to obtain a static view of a database at corresponding time, and data of the whole database are obtained through the snapshotting.

Wherein the performance data of each SQL sentence include the number of times of executions and a buffer gets data volume, and the buffer gets data volume is a data volume read by the SQL sentence from an internal memory.

Step S2, variance calculation is correspondingly carried out on the performance data of the current snapshot and the performance data of the former snapshot respectively to calculate a total buffer gets data volume and a single-execution buffer gets data average volume which correspond to each SQL sentence within the preset first time;

In this embodiment, the variance calculation is correspondingly carried out on the performance data of the current snapshot and the performance data of the former snapshot respectively, that is, the variance calculation (for example, counting and subtraction) is carried out on the total buffer gets data volume corresponding to each current snapshot SQL sentence and the total buffer gets data volume corresponding to each former snapshot SQL sentence to calculate the total buffer gets data volume corresponding to each SQL sentence within the preset first time; the variance calculation (for example, counting and subtraction) is carried out on the single-execution buffer gets data average volume corresponding to each current snapshot SQL sentence and the single-execution buffer gets data average volume corresponding to each former snapshot SQL sentence to calculate the single-execution buffer gets data average volume corresponding to each SQL sentence within the preset first time. For example, if the snapshotting time of the current snapshot is 8:00, and the time interval is 1 hour, then the snapshotting time of the former snapshot is 7:00; after the variance calculation is carried out, the total buffer gets data volume and the single-execution buffer gets data average volume which correspond to each SQL sentence between 7:00 and 8:00 are obtained.

Wherein the single-execution buffer gets data average volume corresponding to one SQL sentence is equal to a quotient of the total buffer gets data volume corresponding to the SQL sentence to the number of times of executions corresponding to the SQL sentence.

S3, a value sum of the total buffer gets data volume and the single-execution buffer gets data average volume of each SQL sentence is obtained, and an SQL sentence to be optimized is selected on the basis of the value sum.

In this embodiment, the value sum of the total buffer gets data volume and the single-execution buffer gets data average volume of each SQL sentence is obtained, that is, for each SQL sentence, only the value of the total buffer gets data volume and the value of the single-execution buffer gets data average volume are added up, thus obtaining the value sum.

For example, if the total buffer gets data volumes of two SQL sentences are the same, and are equal to 100,000, the number of times of executions of the first SQL sentence is 20,000, and the number of times of executions of the second SQL sentence is 50,000, then the single-execution buffer gets data average volume of the first SQL sentence is 5, and the single-execution buffer gets data average volume of the second SQL sentence is 2, so that the second SQL sentence with the sum of (100,000+5) is preferably selected as the SQL sentence to be optimized; for another example, under a condition that the numbers of times of executions of the two SQL sentences are equal, the SQL sentence with the larger total buffer gets data volume is selected as the SQL sentence to be optimized; for another example, under conditions that the total buffer gets data volumes of the two SQL sentences are not equal, and their numbers of times of executions are not equal either, the SQL sentence with the larger sum of the value of the total buffer gets data volume and the value of the single-execution buffer gets data average volume is selected as the SQL sentence to be optimized.

Wherein the single-execution buffer gets data average volume represents an average volume of buffer gets data executed once by one SQL sentence; if the average volume is larger, more buffer gets data may be executed once by the SQL sentence; under the same total buffer gets data volume, if the single-execution buffer gets data average volume of one SQL sentence is larger, the SQL sentence is relatively high in performance, and is preferably used as the SQL sentence to be optimized. It can be seen from the value sum that in this embodiment, the use condition of the SQL sentence is overall and comprehensively estimated on the basis of the total buffer gets data volume and the single-execution buffer gets data average volume; and a larger value sum of an SQL sentence indicates that the SQL sentence is higher in use frequency and performance.

In this embodiment, the SQL sentences to be optimized are selected on the basis of the value sum, and may be sequenced according to the value sums from large to small, so that the SQL sentences to be optimized may be selected according to the sequencing order, wherein the SQL sentences arranged ahead are the SQL sentences to be optimized.

Compared with the prior art, this embodiment carries out snapshotting on the performance data of the SQL sentence every preset time, and carries out the variance calculation on the performance data snapshot at this time and the performance data snapshot at the last time to calculate the total buffer gets data volume and the single-execution buffer gets data average volume which correspond to each SQL sentence within the preset time, SQL sentences with high use frequency and performance may be obtained according to the total buffer gets data volume and the single-execution buffer gets data average volume which correspond to each SQL sentence, and are optimized, thus improving the response speed of an application system. As the SQL sentence to be optimized is selected on the basis of the value sum of the total buffer gets data volume and the single-execution buffer gets data average volume, this embodiment can accurately position the SQL sentence to be optimized, and the optimization efficiency is improved.

In one preferred embodiment, on the basis of the embodiment of FIG. 1, the step S2 is replaced by:

the variance calculation is correspondingly carried out on the performance data of the current snapshot and the performance data of the former snapshot to calculate the total buffer gets data volume corresponding to each SQL sentence, a sum of the total buffer gets data volumes of all the SQL sentences and the single-execution buffer gets data average volume of each SQL sentence within the preset first time;

a ratio of the total buffer gets data volume corresponding to each SQL sentence to the sum of the total buffer gets data volumes of all the SQL sentences is obtained;

the SQL sentence with the ratio greater than a preset ratio is selected as an SQL sentence for executing the step S3.

In this embodiment, the variance calculation is correspondingly carried out on the performance data of the current snapshot and the performance data of the former snapshot respectively, that is, the variance calculation (for example, counting and subtraction) is carried out on the total buffer gets data volume corresponding to each current snapshot SQL sentence and the total buffer gets data volume corresponding to each former snapshot SQL sentence to calculate the total buffer gets data volume corresponding to each SQL sentence within the preset first time;

the variance calculation (for example, counting and subtraction) is carried out on the sum of the total buffer gets data volumes of all the current snapshot SQL sentences and the sum of the total buffer gets data volumes of all the former snapshot SQL sentences to calculate the sum of the total buffer gets data volumes of all the SQL sentences within the preset first time;

the variance calculation (for example, counting and subtraction) is carried out on the single-execution buffer gets data average volume corresponding to each current snapshot SQL sentence and the single-execution buffer gets data average volume corresponding to each former snapshot SQL sentence to calculate the single-execution buffer gets data average volume corresponding to each SQL sentence within the preset first time.

Then the ratio of the total buffer gets data volume corresponding to each SQL sentence to the sum of the total buffer gets data volumes of all the SQL sentences is obtained; a small ratio indicates that the SQL sentence is not often used, and corresponding SQL sentences with the ratios less than the preset ratio are filtered out, for example, the SQL sentences with the ratios less than or equal to 1% are filtered out, and corresponding SQL sentences with the ratios greater than the preset ratio are selected as the SQL sentences for executing the step S3.

Figure 2:
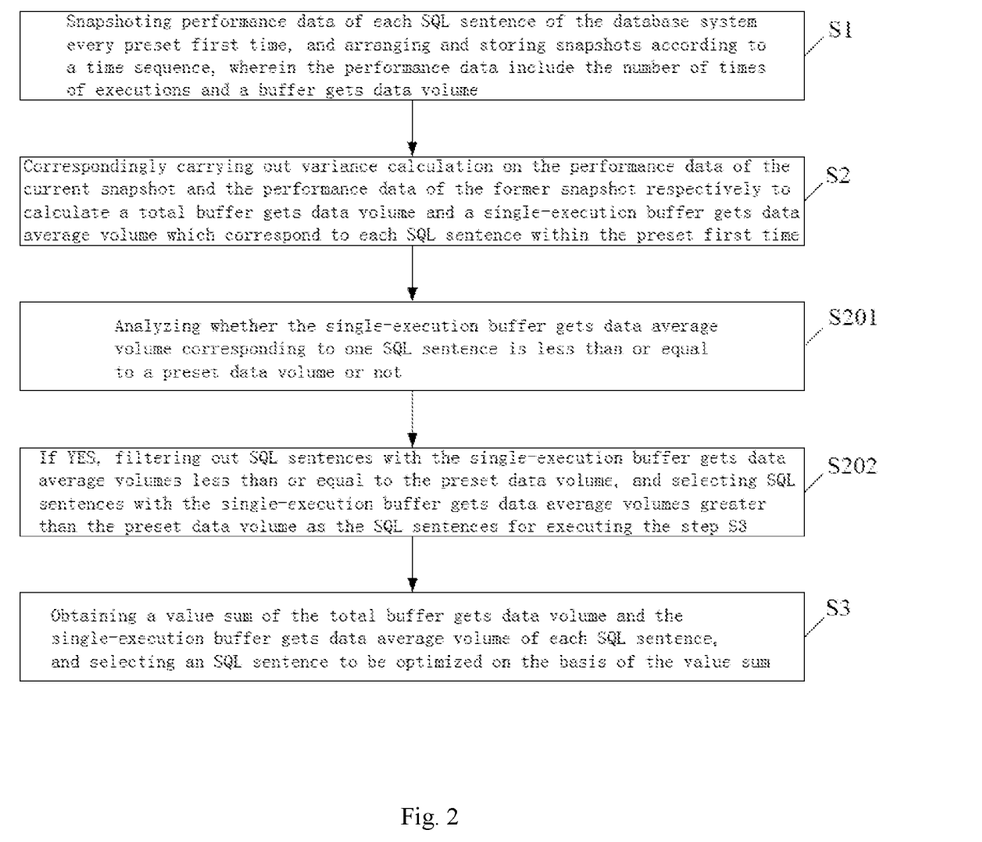
FIG. 2 is a flowchart of a second embodiment of a method of optimizing a database system of the disclosure.

In one preferred embodiment, as shown in FIG. 2, on the basis of the embodiment of FIG. 1, after the step S2, the method includes:

S201, whether the single-execution buffer gets data average volume corresponding to one SQL sentence is less than or equal to a preset data volume or not is analyzed;

S202, if YES, SQL sentences with the single-execution buffer gets data average volumes less than or equal to the preset data volume are filtered out, and SQL sentences with the single-execution buffer gets data average volumes greater than the preset data volume are selected as the SQL sentences for executing the step S3.

In this embodiment, after the total buffer gets data volume and the single-execution buffer gets data average volume which correspond to each SQL sentence are calculated, whether the single-execution buffer gets data average volume corresponding to one SQL sentence is less than or equal to the preset data volume or not is analyzed; as the single-execution buffer gets data average volume of the SQL sentence represents the size of the performance of the SQL sentence, SQL sentences with the single-execution buffer gets data average volumes less than or equal to the preset data volume are filtered out, for example, SQL sentences with the single-execution buffer gets data average volumes less than or equal to 100 are filtered out, and SQL sentences with the single-execution buffer gets data average volumes greater than the preset data volume are selected as the SQL sentences for executing the step S3.

Figure 3:
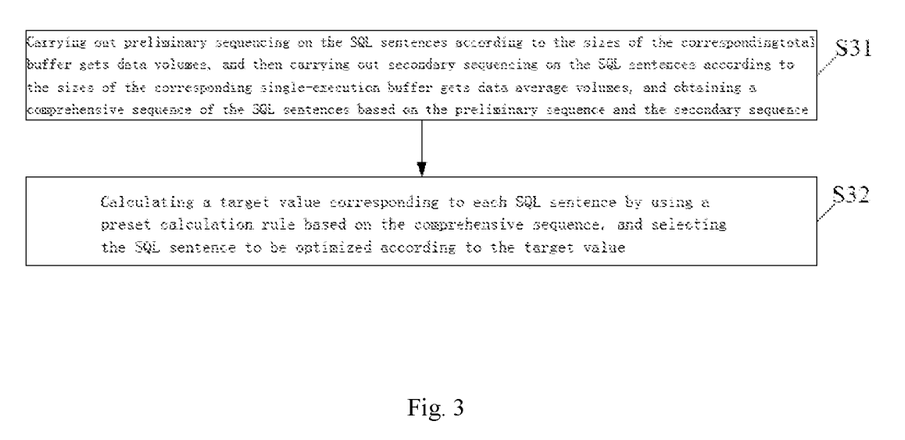
FIG. 3 is a detailed flowchart of the step S3 in FIG. 1.

In one preferred embodiment, as shown in FIG. 3, on the basis of the embodiment of FIG. 1, the step S3 includes:

S31, the SQL sentences are subjected to preliminary sequencing according to the sizes of the corresponding total buffer gets data volumes, and then are subjected to secondary sequencing according to the sizes of the corresponding single-execution buffer gets data average volumes, and a comprehensive sequence of the SQL sentences based on the preliminary sequence and the secondary sequence is obtained;

S32, a target value corresponding to each SQL sentence is calculated by using a preset calculation rule based on the comprehensive sequence, and the SQL sentence to be optimized is selected according to the target value.

In this embodiment, the SQL sentences are subjected to preliminary sequencing according to the sizes of the corresponding total buffer gets data volumes, that is, the SQL sentences are sequenced according to the total buffer gets data volumes from large to small, for example, the SQL sentences A, B, C, D and E are sequenced according to the sizes of the corresponding total buffer gets data volumes, thus obtaining B, C, D, A and E, and corresponding sequence numbers may be generated, for example, the sequence numbers corresponding to the SQL sentences B, C, D, A and E may be 1, 2, 3, 4 and 5.

The SQL sentences then are subjected to secondary sequencing according to the sizes of the corresponding single-execution buffer gets data average volumes, that is, the SQL sentences are sequenced according to the single-execution buffer gets data average volumes from large to small, for example, the SQL sentences A, B, C, D and E are sequenced according to the sizes of the corresponding total buffer gets data volumes, thus obtaining D, A, E, B and C, and corresponding sequence numbers may be generated, for example, the sequence numbers corresponding to the SQL sentences D, A, E, B and C may be 1, 2, 3, 4 and 5.

The comprehensive sequence numbers of the SQL sentences are obtained on the basis of the preliminary sequence and the secondary sequence, for example, the sequence numbers of the preliminary sequence and the sequence numbers of the secondary sequence are added up, thus obtaining A(4+2), B(4+1), C(2+5), D(3+1) and E(5+3), namely the comprehensive sequence is E, C, A, B and D, and the comprehensive sequence numbers of the SQL sentences E, C, A, B and D are finally generated, for example, the sequence numbers corresponding to the SQL sentences E, C, A, B and D are 1, 2, 3, 4 and 5.

Of course, this embodiment also may adopt other comprehensive sequences obtained on the basis of the preliminary sequence and the secondary sequence, and no more details will be given here.

It can be seen that the comprehensively sequenced SQL sentences are sequenced by comprehensively considering the total buffer gets data volumes and the single-execution buffer gets data average volumes of the SQL sentences according to the volumes from large to small, so that it can be understood that the comprehensively sequenced SQL sentences are sequenced according to their use frequencies and performances from high to low.

In this embodiment, the target value corresponding to each SQL sentence is calculated by using the preset calculation rule based on the comprehensive sequence, and the SQL sentence to be optimized is selected according to the target value.

Preferably, a quotient of the comprehensive sequence number corresponding to the comprehensive sequence of each SQL sentence to the quantity of all the SQL sentences may be calculated, thus obtaining the target value corresponding to each SQL sentence; whether the target value of at least one SQL sentence exists or not within preset second time (for example, within 10 hours) is analyzed, wherein the preset second time is longer than the preset first time; if YES, the target values corresponding to the same SQL sentences within the preset second time are added up to obtain a target value sum of the same SQL sentences. For example, if, within the preset second time, one SQL sentence corresponds to multiple target values, all the target values corresponding to the SQL sentence are added up to obtain a target value sum corresponding to the SQL sentence; if, within the preset second time, one SQL sentence only corresponds to one target value, the target value is regarded as the target value sum corresponding to the SQL sentence. The SQL sentences with the target value sums greater than a preset value are regarded as the SQL sentences to be optimized.

Figure 4:
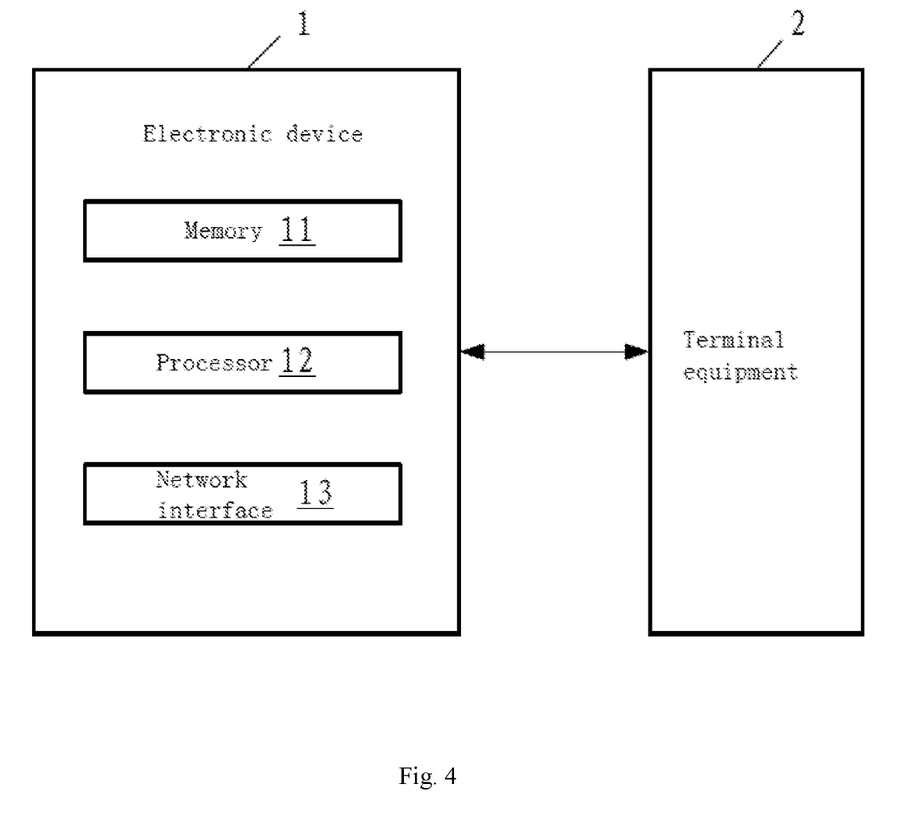
FIG. 4 is a schematic diagram of an application environment optional for various embodiments of the disclosure.

FIG. 4 is an application environment schematic diagram of an application environment of preferred embodiments of all the embodiments of the disclosure. The application environment schematic diagram includes an electronic device 1 and terminal equipment 2. The electronic device 1 may execute data interaction with the terminal equipment 2 through proper technologies such as a network and a near field communication technology.

The terminal equipment 2 includes, but not limited to, any electronic products capable of realizing human-machine interaction with a user by means of a keyboard, a mouse, a remote controller, a touch panel, or sound control equipment and the like, for example, mobile equipment such as a personal computer, a flat computer, a smart mobile phone, a Personal Digital Assistant (PDA), a game machine, an Internet Protocol Television (IPTV), intelligent wearable equipment and a navigation device, or fixed terminals such as a digital TV, a desktop computer, a notebook computer and a server.

The electronic device 1 is equipment capable of automatically calculating a value and/or processing information according to a preset or pre-stored instruction. The electronic device 1 may be a computer, a single network server, a server group consisting of multiple network servers, or a cloud computing-based cloud consisting of a large number of host units or network servers, wherein as one of distributed computations, cloud computing is a super virtual computer consisting of a group of loosely-coupled computer sets.

In this embodiment, the electronic device 1 may include, but not limited to, a memory 11, a processor 12 and a network interface 13 which are connected with one another through a system bus in a communicating manner; the memory 11 stores a system of optimizing a database system, which may be operated in the processor 12. It should be noted that FIG. 4 only shows the electronic device 1 having assemblies from 11 to 13, but it should be understood that not all the assemblies shown are required to be implemented, and more or fewer assemblies may be implemented instead.

Further, the storage equipment 11 includes an internal memory and at least one type of readable storage medium. The internal memory provides a buffer for operation of the electronic device 1; the readable storage medium may be a non-volatile storage medium, such as a flash memory, a hard disk, a multimedia card, a card type memory (for example, an SD or DX memory), a Random Access Memory (RAM), a Static Random Access Memory (SRAM), a Read-Only Memory (ROM), an Electrically Programmable Read-Only Memory (EPROM), a Programmable Read-Only Memory (PROM), a magnetic memory, a magnetic disk and an optical disk. In some embodiments, the readable storage medium may be an internal storage unit of the electronic device 1, for example, a hard disk of the electronic device 1; in some other embodiments, the non-volatile storage medium also may be external storage equipment of the electronic device 1, for example, a plugin type hard disk, a Smart Media Card (SMC), a Secure Digital (SD) card, a Flash Card (FC) and the like which are equipped on the electronic device 1. In this embodiment, the readable storage medium of the storage equipment 11 is generally used for storing an operating system and all types of application software which are installed in the electronic device 1, for example, a program code of the system of optimizing the database system in one embodiment of the disclosure and the like. In addition, the storage equipment 11 may be also used for temporarily storing all types of data which have been output or are about to be output.

The processor 12 in some embodiments may be a Central Processing Unit (CPU), a controller, a micro controller, a micro processor or other data processing chips. The processor 12 is generally used for controlling overall operation of the electronic device 1, for example, executing data interaction with the terminal equipment 2 or communication-related control and processing and the like. In this embodiment, the processor 12 is used for operating the program code stored in the memory 11 or processing data, for example, operating the system of optimizing the database system and the like.

The network interface 13 may include a wireless network interface or a wired network interface. The network interface 13 is generally used for establishing communication connection between the electronic device 1 and other sets of electronic equipment. In this embodiment, the network interface 13 is mainly used for connecting the electronic device 1 with one or multiple sets of terminal equipment 2 to establish a data transmission channel and communication connection between the electronic device 1 and one or multiple sets of terminal equipment 2.

The system of optimizing the database system is stored in the memory 11, and includes at least one computer readable instruction stored in the memory 11. The at least one computer readable instruction may be executed by the processor to realize the methods of all the embodiments of the disclosure, and may be divided into different logic modules according to different functions realized by all its parts.

The system of optimizing the database system is executed by the processor 12 to implement the following steps: snapshotting is carried out on performance data of each SQL (Structured Query Language) sentence of the database system every preset first time, and snapshots are arranged and stored according to a time sequence, wherein the performance data include the number of times of executions and a buffer gets data volume; variance calculation is correspondingly carried out on the performance data of the current snapshot and the performance data of the former snapshot respectively to calculate a total buffer gets data volume and a single-execution buffer gets data average volume which correspond to each SQL sentence within the preset first time; a value sum of the total buffer gets data volume and the single-execution buffer gets data average volume of each SQL sentence is obtained, and an SQL sentence to be optimized is selected on the basis of the value sum. Therefore, the SQL sentence to be optimized may be accurately positioned, and the optimization efficiency is improved.

Figure 5:
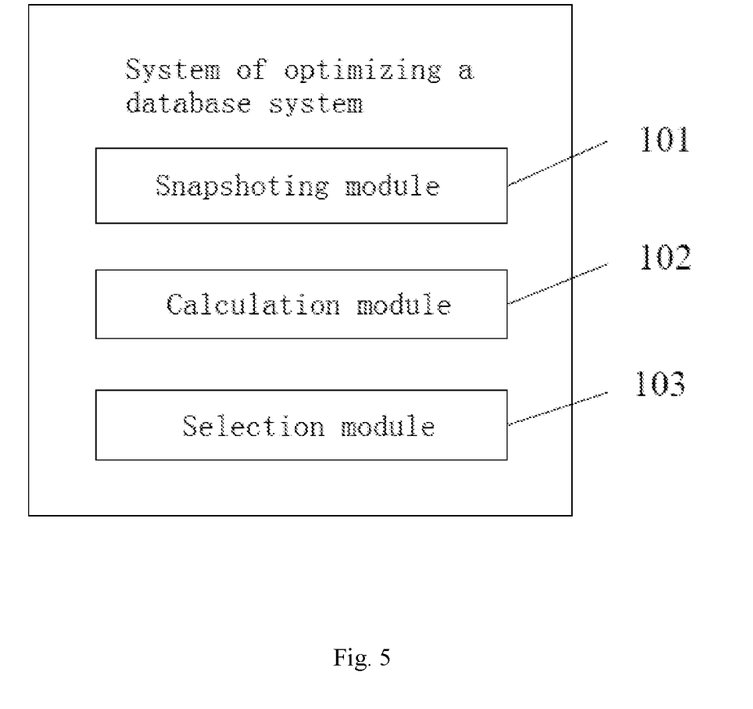
FIG. 5 is a schematic diagram of a structure of a first embodiment of a system of optimizing a database system of the disclosure.

As shown in FIG. 5, FIG. 5 is a schematic diagram of a structure of one embodiment of a system of optimizing a database system of the disclosure. The system of optimizing the database system may be divided into multiple functional modules according to its different functions, and includes:

a snapshotting module 101, which is used for snapshotting performance data of each SQL (Structured Query Language) sentence of the database system every preset first time, and arranging and sorting snapshots according to a time sequence, wherein the performance data includes the number of times of executions and a buffer gets data volume;

in this embodiment, the snapshotting is carried out on the performance data of each SQL sentence of the database system every the preset first time, for example, the snapshotting is carried out on the performance data of each SQL sentence every 1 hour so as to obtain a static view of a database at corresponding time, and data of the whole database are obtained through the snapshotting.

Wherein the performance data of each SQL sentence include the number of times of executions and the buffer gets data volume, and the buffer gets data volume is a data volume read by the SQL sentence from an internal memory.

a calculation module 102, which is used for correspondingly carrying out variance calculation on the performance data of the current snapshot and the performance data of the former snapshot respectively to calculate a total buffer gets data volume and a single-execution buffer gets data average volume which correspond to each SQL sentence within the preset first time;

in this embodiment, the variance calculation is correspondingly carried out on the performance data of the current snapshot and the performance data of the former snapshot respectively, that is, the variance calculation (for example, counting and subtraction) is carried out on the total buffer gets data volume corresponding to each current snapshot SQL sentence and the total buffer gets data volume corresponding to each former snapshot SQL sentence to calculate the total buffer gets data volume corresponding to each SQL sentence within the preset first time; the variance calculation (for example, counting and subtraction) is carried out on the single-execution buffer gets data average volume corresponding to each current snapshot SQL sentence and the single-execution buffer gets data average volume corresponding to each former snapshot SQL sentence to calculate the single-execution buffer gets data average volume corresponding to each SQL sentence within the preset first time. For example, if the snapshotting time of the current snapshot is 8:00, and the time interval is 1 hour, then the snapshotting time of the former snapshot is 7:00; after the variance calculation is carried out, the total buffer gets data volume and the single-execution buffer gets data average volume which correspond to each SQL sentence between 7:00 and 8:00 are obtained.

Wherein the single-execution buffer gets data average volume corresponding to one SQL sentence is equal to a quotient of the total buffer gets data volume corresponding to the SQL sentence to the number of times of executions corresponding to the SQL sentence.

a selection module 103, which is used for obtaining a value sum of the total buffer gets data volume and the single-execution buffer gets data average volume of each SQL sentence, and selecting an SQL sentence to be optimized on the basis of the value sum.

In this embodiment, the value sum of the total buffer gets data volume and the single-execution buffer gets data average volume of each SQL sentence is obtained, that is, for each SQL sentence, only the value of the total buffer gets data volume and the value of the single-execution buffer gets data average volume are added up, thus obtaining the value sum.

For example, if the total buffer gets data volumes of two SQL sentences are the same, and are equal to 100,000, the number of times of executions of the first SQL sentence is 20,000, and the number of times of executions of the second SQL sentence is 50,000, then the single-execution buffer gets data average volume of the first SQL sentence is 5, and the single-execution buffer gets data average volume of the second SQL sentence is 2, so that the second SQL sentence with the sum of (100,000+5) is preferably selected as the SQL sentence to be optimized; for another example, under a condition that the numbers of times of executions of the two SQL sentences are equal, the SQL sentence with the larger total buffer gets data volume is selected as the SQL sentence to be optimized; for another example, under conditions that the total buffer gets data volumes of the two SQL sentences are not equal, and their numbers of times of executions are not equal either, the SQL sentence with the larger sum of the value of the total buffer gets data volume and the value of the single-execution buffer gets data average volume is selected as the SQL sentence to be optimized.

Wherein the single-execution buffer gets data average volume represents an average volume of buffer gets data executed once by one SQL sentence; if the average volume is larger, more buffer gets data may be executed once by the SQL sentence; under the same total buffer gets data volume, if the single-execution buffer gets data average volume of one SQL sentence is larger, the SQL sentence is relatively high in performance, and is preferably used as the SQL sentence to be optimized. It can be seen from the value sum that in this embodiment, the use condition of the SQL sentence is overall and comprehensively estimated on the basis of the total buffer gets data volume and the single-execution buffer gets data average volume; and a larger value sum of an SQL sentence indicates that the SQL sentence is higher in use frequency and performance.

In this embodiment, the SQL sentences to be optimized are selected on the basis of the value sum, and may be sequenced according to the value sums from large to small, so that the SQL sentences to be optimized may be selected according to the sequencing order, wherein the SQL sentences arranged ahead are the SQL sentences to be optimized.

In one preferred embodiment, on the basis of the embodiment of FIG. 5, the calculation module 102 is replaced by a processing module, which is used for correspondingly carrying out the variance calculation on the performance data of the current snapshot and the performance data of the former snapshot to calculate the total buffer gets data volume corresponding to each SQL sentence, a sum of the total buffer gets data volumes of all the SQL sentences and the single-execution buffer gets data average volume of each SQL sentence within the preset first time; obtaining a ratio of the total buffer gets data volume corresponding to each SQL sentence to the sum of the total buffer gets data volumes of all the SQL sentences; and selecting the SQL sentence with the ratio greater than a preset ratio as an SQL sentence of the selection module.

In this embodiment, the variance calculation is correspondingly carried out on the performance data of the current snapshot and the performance data of the former snapshot respectively, that is, the variance calculation (for example, counting and subtraction) is carried out on the total buffer gets data volume corresponding to each current snapshot SQL sentence and the total buffer gets data volume corresponding to each former snapshot SQL sentence to calculate the total buffer gets data volume corresponding to each SQL sentence within the preset first time;

the variance calculation (for example, counting and subtraction) is carried out on the sum of the total buffer gets data volumes of all the current snapshot SQL sentences and the sum of the total buffer gets data volumes of all the former snapshot SQL sentences to calculate the sum of the total buffer gets data volumes of all the SQL sentences within the preset first time;

the variance calculation (for example, counting and subtraction) is carried out on the single-execution buffer gets data average volume corresponding to each current snapshot SQL sentence and the single-execution buffer gets data average volume corresponding to each former snapshot SQL sentence to calculate the single-execution buffer gets data average volume corresponding to each SQL sentence within the preset first time.

Then the ratio of the total buffer gets data volume corresponding to each SQL sentence to the sum of the total buffer gets data volumes of all the SQL sentences is obtained; a small ratio indicates that the SQL sentence is not often used, and corresponding SQL sentences with the ratios less than the preset ratio are filtered out, for example, the SQL sentences with the ratios less than or equal to 1% are filtered out, and corresponding SQL sentences with the ratios greater than the preset ratio are selected as the SQL sentences of the selection module 103.

Figure 6:
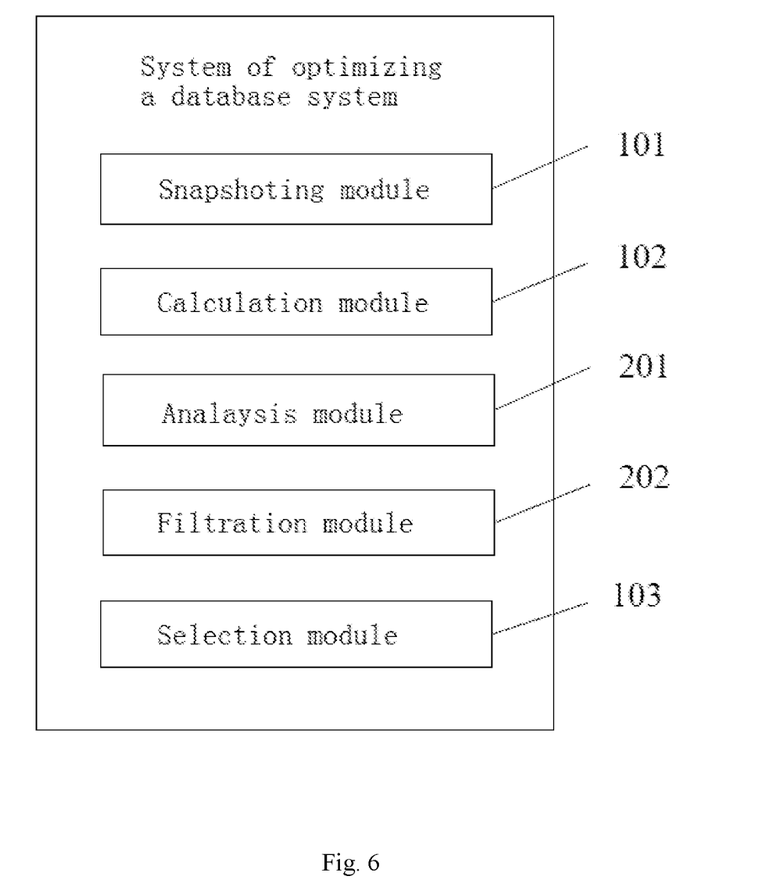
FIG. 6 is a schematic diagram of a structure of a second embodiment of a system of optimizing a database system of the disclosure.

In one preferred embodiment, as shown in FIG. 6, on the basis of the embodiment of FIG. 5, the system of optimizing the database system further includes:

an analysis module 201, which is used for analyzing whether the single-execution buffer gets data average volume corresponding to one SQL sentence is less than or equal to a preset data volume or not;

a filtration module 202, which is used for, if YES, filtering out SQL sentences with the single-execution buffer gets data average volumes less than or equal to the preset data volume, and selecting SQL sentences with the single-execution buffer gets data average volumes greater than the preset data volume as the SQL sentences of the selection module.

In this embodiment, after the total buffer gets data volume and the single-execution buffer gets data average volume which correspond to each SQL sentence are calculated, whether the single-execution buffer gets data average volume corresponding to one SQL sentence is less than or equal to the preset data volume or not is analyzed; as the single-execution buffer gets data average volume of the SQL sentence represents the size of the performance of the SQL sentence, SQL sentences with the single-execution buffer gets data average volumes less than or equal to the preset data volume are filtered out, for example, SQL sentences with the single-execution buffer gets data average volumes less than or equal to 100 are filtered out, and SQL sentences with the single-execution buffer gets data average volumes greater than the preset data volume are selected as the SQL sentences of the selection module 102.

Figure 7:
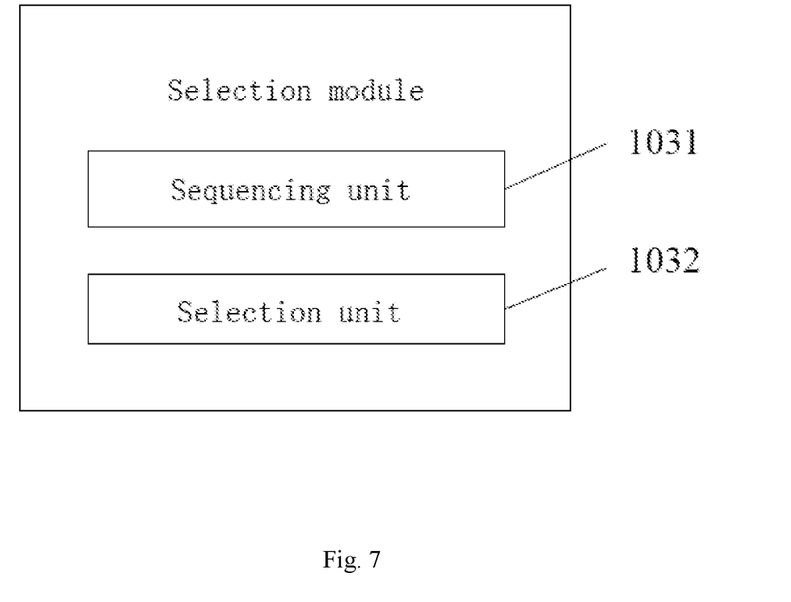
FIG. 7 is a schematic diagram of a structure of a selection module as shown in FIG. 5.

In one preferred embodiment, as shown in FIG. 7, on the basis of the embodiment of FIG. 5, the selection module 103 includes:

A sequencing unit 1031, which is used for carrying out preliminary sequencing on the SQL sentences according to the sizes of the corresponding total buffer gets data volumes, and then carrying out secondary sequencing on the SQL sentences according to the sizes of the corresponding single-execution buffer gets data average volumes, and obtaining a comprehensive sequence of the SQL sentences based on the preliminary sequence and the secondary sequence;

a selection unit 1032, which is used for calculating a target value corresponding to each SQL sentence by using a preset calculation rule based on the comprehensive sequence, and selecting the SQL sentence to be optimized according to the target value.

In this embodiment, the SQL sentences are subjected to the preliminary sequencing according to the sizes of the corresponding total buffer gets data volumes, that is, the SQL sentences are sequenced according to the total buffer gets data volumes from large to small, for example, the SQL sentences A, B, C, D and E are sequenced according to the sizes of the corresponding total buffer gets data volumes, thus obtaining B, C, D, A and E, and corresponding sequence numbers may be generated, for example, the sequence numbers corresponding to the SQL sentences B, C, D, A and E may be 1, 2, 3, 4 and 5.

The SQL sentences then are subjected to the secondary sequencing according to the sizes of the corresponding single-execution buffer gets data average volumes, that is, the SQL sentences are sequenced according to the single-execution buffer gets data average volumes from large to small, for example, the SQL sentences A, B, C, D and E are sequenced according to the sizes of the corresponding total buffer gets data volumes, thus obtaining D, A, E, B and C, and corresponding sequence numbers may be generated, for example, the sequence numbers corresponding to the SQL sentences D, A, E, B and C may be 1, 2, 3, 4 and 5.

The comprehensive sequence numbers of the SQL sentences are obtained on the basis of the preliminary sequence and the secondary sequence, for example, the sequence numbers of the preliminary sequence and the sequence numbers of the secondary sequence are added up, thus obtaining A(4+2), B(4+1), C(2+5), D(3+1) and E(5+3), namely the comprehensive sequence is E, C, A, B and D, and the comprehensive sequence numbers of the SQL sentences E, C, A, B and D are finally generated, for example, the sequence numbers corresponding to the SQL sentences E, C, A, B and D are 1, 2, 3, 4 and 5.

Of course, this embodiment also may adopt other comprehensive sequences obtained on the basis of the preliminary sequence and the secondary sequence, and no more details will be given here.

It can be seen that the comprehensively sequenced SQL sentences are sequenced by comprehensively considering the total buffer gets data volumes and the single-execution buffer gets data average volumes of the SQL sentences according to the volumes from large to small, so that it can be understood that the comprehensively sequenced SQL sentences are sequenced according to their use frequencies and performances from high to low.

In this embodiment, the target value corresponding to each SQL sentence is calculated by using the preset calculation rule based on the comprehensive sequence, and the SQL sentence to be optimized is selected according to the target value.

Preferably, the selection unit 1032 is specifically used for calculating a quotient of the comprehensive sequence number corresponding to the comprehensive sequence of each SQL sentence to the quantity of all the SQL sentences, thus obtaining the target value corresponding to each SQL sentence; analyzing whether the target value of at least one SQL sentence exists or not within preset second time (for example, within 10 hours), wherein the preset second time is longer than the preset first time; and if YES, adding up the target values corresponding to the same SQL sentences within the preset second time to obtain a target value sum of the same SQL sentences. For example, if, within the preset second time, one SQL sentence corresponds to multiple target values, all the target values corresponding to the SQL sentence are added up to obtain a target value sum corresponding to the SQL sentence; if, within the preset second time, one SQL sentence only corresponds to one target value, the target value is regarded as the target value sum corresponding to the SQL sentence. The SQL sentences with the target value sums greater than a preset value are regarded as the SQL sentences to be optimized.

The foregoing embodiments are preferred embodiments of the disclosure, but not intended to limit the disclosure. Any modifications, equivalent replacements and improvements that are made without departing from the spirit and the principle of the disclosure shall all fall in the scope of protection of the disclosure.

What is claimed is:

1. A method of optimizing a database system, comprising:
S1, snapshotting performance data of each Structured Query Language (SQL) sentence of the database system every preset first time, and arranging and storing snapshots according to a time sequence, wherein the performance data include a number of times of executions and a buffer gets data volume;
S2, correspondingly carrying out variance calculation on the performance data of a current snapshot and the performance data of a former snapshot respectively to calculate a total buffer gets data volume and a single-execution buffer gets data average volume corresponding to each SQL sentence within the preset first time;
S3, obtaining a value sum of the total buffer gets data volume and the single-execution buffer gets data average volume of each SQL sentence, and selecting an SQL sentence to be optimized on a basis of the value sum;
wherein the step S3 comprises:
S31, carrying out a preliminary sequencing on SQL sentences according to sizes of corresponding total buffer gets data volumes, and then carrying out a secondary sequencing on the SQL sentences according to sizes of corresponding single-execution buffer gets data average volumes, and obtaining a comprehensive sequencing of the SQL sentences based on the preliminary sequencing and the secondary sequencing;
S32, calculating a target value corresponding to each SQL sentence by using a preset calculation rule based on the comprehensive sequencing, and selecting the SQL sentence to be optimized according to the target value;
wherein the step S32 comprises:
calculating a quotient of a comprehensive sequence number corresponding to the comprehensive sequencing of each SQL sentence to a quantity of all the SQL sentences, thus obtaining the target value corresponding to each SQL sentence;
analyzing whether a target value of at least one SQL sentence exists or not within a preset second time, wherein the preset second time is longer than the preset first time;
in response to determining that the target value of at the least one SQL sentence exists within the preset second time, adding up target values corresponding to the same SQL sentences within the preset second time to obtain a target value sum of the same SQL sentences;
selecting the SQL sentences with target value sums greater than a preset value as the SQL sentences to be optimized; and
optimizing the selected SQL sentences.

2. The method of optimizing the database system of claim 1, wherein the step S2 is replaced by:
correspondingly carrying out variance calculation on the performance data of the current snapshot and the performance data of the former snapshot to calculate the total buffer gets data volume corresponding to each SQL sentence, a sum of the total buffer gets data volumes of all the SQL sentences and the single-execution buffer gets data average volume of each SQL sentence within the preset first time;
obtaining a ratio of the total buffer gets data volume corresponding to each SQL sentence to the sum of the total buffer gets data volumes of all the SQL sentences;
selecting an SQL sentence with a ratio greater than a preset ratio as the SQL sentence for executing the step S3.

3. The method of optimizing the database system of claim 1, wherein after the step S2, the method comprises:

S201, analyzing whether the single-execution buffer gets data average volume corresponding to one SQL sentence is less than or equal to a preset data volume or not;

S202, if YES, filtering out the SQL sentence with the single-execution buffer gets data average volumes less than or equal to the preset data volume, and selecting SQL sentences with the single-execution buffer gets data average volume greater than the preset data volume as the SQL sentences for executing the step S3.

4. An electronic device, comprising a memory and a processor connected with the memory, wherein the memory stores a system of optimizing a database system operated in the processor; the system of optimizing a database system operated in the processor is executed by the processor to implement following steps:

S1, snapshotting performance data of each Structured Query Language (SQL) sentence of the database system every preset first ti me, and arranging and storing snapshots according to a time sequence, wherein the performance data include a number of times of executions and a buffer gets data volume;

S2, correspondingly carrying out variance calculation on the performance data of a current snapshot and the performance data of a former snapshot respectively to calculate a total buffer gets data volume and a single-execution buffer gets data average volume corresponding to each SQL sentence within the preset first time;

S3, obtaining a value sum of the total buffer gets data volume and the single-execution buffer gets data average volume of each SQL sentence, and selecting an SQL sentence to be optimized on a basis of the value sum;

wherein the step S3 comprises:

S31, carrying out a preliminary sequencing on SQL sentences according to sizes of corresponding total buffer gets data volumes, and then carrying out a secondary sequencing on the SQL sentences according to sizes of corresponding single-execution buffer gets data average volumes, and obtaining a comprehensive sequencing of the SQL sentences based on the preliminary sequencing and the secondary sequencing;

S32, calculating a target value corresponding to each SQL sentence by using a preset calculation rule based on the comprehensive sequencing, and selecting the SQL sentence to be optimized according to the target value;

wherein the step S32 comprises:

calculating a quotient of a comprehensive sequence number corresponding to the comprehensive sequencing of each SQL sentence to a quantity of all the SQL sentences, thus obtaining the target value corresponding to each SQL sentence;

analyzing whether a target value of at least one SQL sentence exists or not within a preset second time, wherein the preset second time is longer than the preset first time;

in response to determining that the target value of at the least one SQL sentence exists within the preset second time, adding up target values corresponding to the same SQL sentences within the preset second time to obtain a target value sum of the same SQL sentences;

selecting the SQL sentences with target value sums greater than a preset value as the SQL sentences to be optimized; and optimizing the selected SQL sentences.

5. The electronic device of claim 4, wherein the step S2 is replaced by:

correspondingly carrying out the variance calculation on the performance data of the current snapshot and the performance data of the former snapshot to calculate the total buffer gets data volume corresponding to each SQL sentence, a sum of the total buffer gets data volumes of all the SQL sentences and the single-execution buffer gets data average volume of each SQL sentence within the preset first time;

obtaining a ratio of the total buffer gets data volume corresponding to each SQL sentence to the sum of the total buffer gets data volumes of all the SQL sentences;

selecting an SQL sentence with a ratio greater than a preset ratio as the SQL sentence for executing the step S3.

6. The electronic device of claim 4, wherein the system of optimizing the database system is executed by the processor to also implement following steps:

S201, analyzing whether the single-execution buffer gets data average volume corresponding to one SQL sentence is less than or equal to a preset data volume or not;

S202, if YES, filtering out the SQL sentence with the single-execution buffer gets data average volumes less than or equal to the preset data volume, and selecting SQL sentences with the single-execution buffer gets data average volume greater than the preset data volume as the SQL sentence for executing the step S3.

7. A non-transitory computer readable storage medium, which stores a system of optimizing a database system, wherein the system of optimizing a database system operated in the processor is executed by the processor to implement following steps:

S1, snapshotting performance data of each Structured Query Language (SQL) sentence of the database system every preset first time, and arranging and storing snapshots according to a time sequence, wherein the performance data include a number of times of executions and a buffer gets data volume;

S2, correspondingly carrying out variance calculation on the performance data of a current snapshot and the performance data of a former snapshot respectively to calculate a total buffer gets data volume and a single-execution buffer gets data average volume corresponding to each SQL sentence within the preset first time;

S3, obtaining value sum of the total buffer gets data volume and the single-execution buffer gets data average volume of each SQL sentence, and selecting an SQL sentence to be optimized on a basis of the value sum;

wherein the step S3 comprises:

S31, carrying out a preliminary sequencing on SQL sentences according to sizes of corresponding total buffer gets data volumes, and then carrying out a secondary sequencing on the SQL sentences according to sizes of corresponding single-execution buffer gets data average volumes, and obtaining comprehensive sequencing of the SQL sentences based on the preliminary sequencing and the secondary sequencing;

S32, calculating a target value corresponding to each SQL sentence by using a preset calculation rule based on the comprehensive sequencing, and selecting the SQL sentence to be optimized according to the target value;

wherein the step S32 comprises: calculating a quotient of a comprehensive sequence number corresponding to the comprehensive sequencing of each SQL sentence to a quantity of all the SQL sentences, thus obtaining the target value corresponding to each SQL sentence;

analyzing whether a target value of at least one SQL sentence exists or not within a preset second time, wherein the preset second time is longer than the preset first time;

in response to determining that the target value of at least one SQL sentence exists within the preset second time, adding up target values corresponding to the same SQL sentences within the preset second time to obtain a target value sum of the same SQL sentences;

selecting the SQL sentences with target value sums greater than a preset value as the SQL sentences to be optimized; and optimizing the selected SQL sentences.

8. The non-transitory computer readable storage medium of claim 7, wherein the step S2 is replaced by:

correspondingly carrying out variance calculation on the performance data of the current snapshot and the performance data of the former snapshot to calculate the total buffer gets data volume corresponding to each SQL sentence, a sum of the total buffer gets data volumes of all the SQL sentences and the single-execution buffer gets data average volume of each SQL sentence within the preset first time;

obtaining a ratio of the total buffer gets data volume corresponding to each SQL sentence to the sum of the total buffer gets data volumes of all the SQL sentences;

selecting an SQL sentence with a ratio greater than a preset ratio as the SQL sentence for executing the step S3.

9. The non-transitory computer readable storage medium of claim 7, wherein the system of optimizing the database system is executed by the processor to also implement the following steps:

S201, analyzing whether the single-execution buffer gets data average volume corresponding to one SQL sentence is less than or equal to a preset data volume or not;

S202, if YES, filtering out the SQL sentence with the single-execution buffer gets data average volumes less than or equal to the preset data volume, and selecting SQL sentences with the single-execution buffer gets data average volume greater than the preset data volume as the SQL sentences for executing the step S3.

* * * * *